(12) United States Patent
Greb et al.

(10) Patent No.: US 12,422,003 B2
(45) Date of Patent: Sep. 23, 2025

(54) COUPLING DEVICE WITH ACTUATING DEVICE

(71) Applicant: Schaeffler Technologies AG & Co. KG, Herzogenaurach (DE)

(72) Inventors: Peter Greb, Ottersweier (DE); Laszlo Man, Ottersweier (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 18/709,533

(22) PCT Filed: Oct. 18, 2022

(86) PCT No.: PCT/DE2022/100765
§ 371 (c)(1),
(2) Date: May 13, 2024

(87) PCT Pub. No.: WO2023/093929
PCT Pub. Date: Jun. 1, 2023

(65) Prior Publication Data
US 2025/0003456 A1  Jan. 2, 2025

(30) Foreign Application Priority Data
Nov. 25, 2021 (DE) .................. 10 2021 130 856.9

(51) Int. Cl.
*F16D 23/14* (2006.01)
(52) U.S. Cl.
CPC ........ *F16D 23/14* (2013.01); *F16D 2023/141* (2013.01)

(58) Field of Classification Search
CPC .......................... F16D 23/14; F16D 2023/141
See application file for complete search history.

(56) References Cited

U.S. PATENT DOCUMENTS

| | | | |
|---|---|---|---|
| 9,475,385 B1* | 10/2016 | Pritchard | B60K 17/344 |
| 2015/0330506 A1* | 11/2015 | Volpert | F16D 11/04 |
| | | | 74/473.36 |
| 2016/0131253 A1* | 5/2016 | Pritchard | F16H 63/32 |
| | | | 74/665 F |
| 2020/0096054 A1* | 3/2020 | Smith | B60K 17/34 |

(Continued)

FOREIGN PATENT DOCUMENTS

| | | |
|---|---|---|
| DE | 202009007977 U1 | 2/2010 |
| DE | 102013209281 A1 | 11/2014 |
| JP | S62233526 A | 10/1987 |

*Primary Examiner* — Farhana Pervin
(74) *Attorney, Agent, or Firm* — Matthew Evans; Ron Bender

(57) ABSTRACT

The disclosure relates to a coupling device for coupling an input component to an output component so as to transmit a torque in a switchable manner. The coupling device includes a coupling designed to separate the input component and the output component in an open position and to connect these components in a closed position so as to transmit a torque. The coupling device further includes an actuating device, which can be moved between a base position and a switch position to adjust the coupling. The actuating device has an intermediate position which is located between the base position and the switch position, and, while in the intermediate position, the actuating device is pretensioned in the direction of the switch position and/or the base position.

20 Claims, 2 Drawing Sheets

(56) References Cited

U.S. PATENT DOCUMENTS

| | | | |
|---|---|---|---|
| 2021/0341036 A1* | 11/2021 | Mock | F16H 3/724 |
| 2023/0160437 A1* | 5/2023 | Schmidt-Winkel | F16D 11/06 192/29 |
| 2023/0375075 A1* | 11/2023 | Kuribayashi | F16H 3/089 |

* cited by examiner

COUPLING DEVICE WITH ACTUATING DEVICE

CROSS-REFERENCE TO RELATED APPLICATIONS

This application is the U.S. National Phase of PCT Application No. PCT/DE2022/100765 filed on Oct. 18, 2022, which claims priority to DE 10 2021 130 856.9 filed on Nov. 25, 2021, the entire disclosures of which are incorporated by reference herein.

TECHNICAL FIELD

The disclosure relates to a coupling device for coupling an input component with an output component.

BACKGROUND

Coupling devices which are used to connect or separate two shafts to/from each other so as to transmit a torque are already known from the prior art. In particular, such coupling devices are used in drives of motor vehicles, in particular those powered by electric motors, in which there are two drive axles, but at least temporarily only one drive axle is used for driving and, to reduce friction, the additional drive axle not used for driving is decoupled from the drive train by means of the coupling device.

However, the prior art always has the disadvantage that previous coupling devices are actuated by means of an actuating device having an actuator drive, which must have high dynamics to enable rapid connection and separation. However, such actuator drives are generally cost-intensive and space-intensive.

SUMMARY

It is therefore the object of the disclosure to avoid or at least to mitigate the disadvantages of the prior art. In particular, a coupling device having an actuating device should be provided in which a cost-effective and compact actuator drive with low dynamic requirements can be used without negative effects on the system performance, or if fail-safe requirements cannot be met, such as the actuating device remaining in an intermediate position between two switching states in the event of failure of the actuator drive.

The object is achieved by a coupling device as described herein.

In particular, this object is achieved according to the disclosure in a generic device in that the actuating device has an intermediate position located between the base position and the switch position, wherein the actuating device is designed such that the actuating device is pretensioned in the intermediate position. This means that the pretensioning acts on the actuating device in the switching direction of the actuating device. This has the advantage that the pretensioning supports the dynamics of the adjustment, so that an actuator drive with low dynamics can also be used for a sufficiently fast adjustment. Because the actuating device is pretensioned in the switching direction before the actual switching/switching command, the triggering/execution of the actual switching/switching command is accelerated. The upstream pretensioning process, namely the adjustment to the intermediate position, can take place without a time limitation, i.e., also slowly.

According to an example embodiment, the actuating device can have a first actuator element for moving the actuating device in a first switching direction, a second actuator element for moving the actuating device in a second switching direction and a spring device. In the pretensioned state, the spring device can press the first actuator element in the first switching direction and/or the second actuator element in the second switching direction. The spring device thus amplifies the force of the two actuator elements, which causes the movement of the actuating device.

According to a further aspect, the spring device can be a (pressure) spring acting between the first actuator element and the second actuator element. In particular, the spring can be arranged axially between the two actuator elements. This means that the spring is used in a double-sided/symmetric manner, so that only a single spring is required to generate the pretensioning.

According to an example embodiment, the actuating device can have a shift fork that can be axially displaceable by the two actuator elements and a detent. The detent can be designed to lock the shift fork in the axial end positions thereof. In particular, the axial end positions of the shift fork correspond to the positions of the coupling, i.e., an open position and a closed position. This means that the position of the shift fork itself does not change due to the generation of the pretensioning, so that the shift fork and thus the coupling are not moved into an (undefined) intermediate position when the actuating device is in the intermediate position thereof.

According to an example embodiment, the actuating device can have a motor-adjustable switching contour, along the contour of which the first actuator element and the second actuator element are guided in the first switching direction and/or in the second switching direction. The two actuator elements can be designed to follow the contour of the switching contour (i.e., contour followers), so that the position of the actuator elements can be determined by the formation and adjustment of the switching contour.

According to a further aspect, the switching contour can be designed such that the first actuator element and the second actuator element can each be moved between a deflected position and a non-deflected position. In particular, the actuating device can be designed such that the spring device is pretensioned (or maximally pretensioned) when both the first actuator element and the second actuator element are in the deflected position. The actuating device can be designed such that the spring device is relaxed (or minimally pretensioned) when one of the two actuator elements is in the deflected position and one of the two actuator elements is in the non-deflected position. This means that the design and adjustment of the switching contour determine whether the spring device is pretensioned or not.

According to a further aspect, the switching contour can be designed as a circular ring which can be rotated to displace the actuating device. This has the advantage that the switching contour can be rotated in one direction to repeatedly switch back and forth between the base position (via the intermediate position) into the switch position and again (via the intermediate position) into the base position, etc.

According to a further aspect, the actuating device can have an actuator drive for adjusting the switching contour, wherein the actuator drive is designed to be self-locking. Thanks to the self-locking design, the actuator drive can be designed cost-effectively.

According to a further aspect, the actuator drive and the switching contour can be connected to one another via a gear stage for adjusting the switching contour. This has the advantage that the low transmission efficiency resulting from self-locking can be compensated for.

In other words, the disclosure relates to a decoupling unit for driven wheels of a motor vehicle, which can be used to minimize friction in (all-wheel) drives of motor vehicles, in particular in electric vehicles. In particular, if only one of the two axles in a vehicle having two axles each driven by at least one engine is used to drive the vehicle, friction losses arise when the other axle, including the drive shafts and possibly the engine, are carried along by the wheels. To reduce the friction losses, in particular to eliminate them, a decoupling unit/coupling unit according to the disclosure can be used. The decoupling unit can in particular be a positive locking coupling such as a claw coupling, which in contrast to many friction couplings, can be completely released. The actuation of the claw coupling, i.e., an opening and closing, takes place by means of a spring, which is can be pretensioned by the actuator drive before the switching command is issued to maximize the switching dynamics without having to use an actuator drive with high dynamic requirements. Therefore, no "fast drive" is required since, according to the disclosure, slow pretensioning before the switching command and triggering from the switching command are possible. For this purpose, the two ends of a spring, in particular a compression spring, are each connected to a contour follower/actuator element. Due to the pretensioning of the spring, both contour followers each follow a switching contour on one side, which can be advanced in exactly one direction by an actuator motor/drive motor, for example by means of a spur gear stage. For this purpose, the switching contour can be designed as a circular ring, so that it can be rotated in one direction without restriction. A shift fork grips the outside of the contour follower on both sides, which is used to move a shift sleeve, for example. The shift sleeve can have an end position lock on both sides, so that it cannot be (unintentionally) moved due to vibrations, etc. without active spring action. Furthermore, the NVH (noise, vibration, harshness) behavior is improved. In a base position, a first contour follower is in a deflected position and a second contour follower is in a non-deflected position, i.e., in the gap of the (switching) contour. This means that the spring is minimally pretensioned and the shift fork rests against the contour followers on both sides. If the contour is now adjusted/advanced, in particular rotated, by means of an actuator drive, the first contour follower remains in a deflected position, the second contour follower is also moved into a deflected position by means of a ramp on the contour so that the spring is pretensioned to the maximum, but the shift fork remains in the position thereof due to the locking thereof until the switching command is given. If the switching command is given, the contour is further adjusted/advanced, in particular rotated, so that the second contour follower remains in the deflected position, but the first contour follower is pressed into the gap in the contour due to the pretensioned spring, and thus moves the shift fork or presses it with spring force. In a case where the shift sleeve hits teeth of the claw toothing so that it cannot be displaced, the force of the spring remains on the shift fork. As soon as the tooth-on-tooth position is released, the shift sleeve can be moved by the spring without the actuator drive having to remain powered in the meantime. Advantageously, due to the double-sided (symmetrical) use of the spring/actuating spring, only exactly one spring is required for switching in both switching directions. In addition, the actuator drive can be designed to be self-locking. Nevertheless, in the event of a power failure, the shift sleeve cannot remain in an (axial) position between the base position and the switch position, since in the intermediate position only a pretensioning of the spring takes place, initially without displacing the shift sleeve. Due to the low dynamic requirements of the actuator drive and the possibility of designing the drive to be self-locking, a very cost-effective and compact actuator drive is possible without the system performance being impaired or fail-safe requirements not being met, since only a switching frequency depends on the speed of the actuator drive. Furthermore, the actuating device can be void of rolling bearings (self-locking permitted), since the resulting lower transmission efficiency can be compensated for by a correspondingly possible larger drive ratio, whereby costs and installation space can be saved. The decoupling unit according to the disclosure, due to the compactness and robustness thereof, can be positioned on the drive wheel (instead of on the transmission/differential). In addition, the decoupling unit can be used to decouple a side shaft or an entire axle (drive shaft). To rotate the contour, an electric motor, potentially with a (self-locking) gear stage, can be used.

BRIEF DESCRIPTION OF THE DRAWINGS

The disclosure is explained below with the aid of drawings. In the drawings.

DETAILED DESCRIPTION

The figures are merely schematic in nature and serve solely for understanding the disclosure. Identical elements are provided with the same reference symbols.

Figure 1:
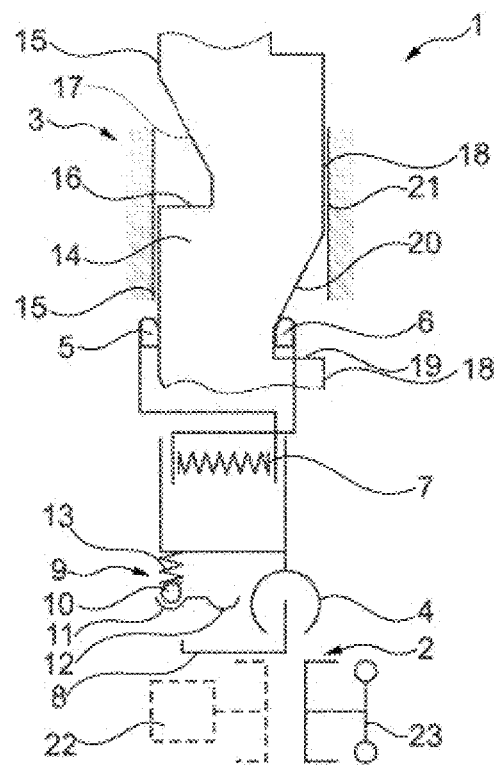
FIG. 1 shows a schematic representation of a coupling device.

FIG. 1 shows a schematic representation of a coupling device 1.

The coupling device 1 is used for a switchable torque-transmitting coupling of an input component to an output component. The coupling device 1 has a coupling 2. The coupling 2 is designed to separate the input component and the output component in an open position by transmitting torque and to connect the components in a closed position by transmitting torque. The coupling 2 can be designed as a positive locking coupling. In the illustrated embodiment, the coupling 2 is designed as a claw coupling, a component/claw toothing of which is connected to the input component and the other component/claw toothing of which is connected to the output component.

The coupling device 1 has an actuating device 3 for adjusting the coupling 2 between the open position thereof and the closed position thereof. For this purpose, the actuating device 3 can be moved between a base position and a switch position. When the actuating device 3 is in the base position, the coupling 2 is in the open position thereof. When the actuating device 3 is in the switch position, the coupling 2 is in the closed position thereof.

In addition, the actuating device 3 has an intermediate position that rests between the base position and the switch position. This means that the actuating device 3 is moved to shift from the base position to the switch position or vice versa for shifting from the switch position to the base position to the intermediate position and from there into the switch position or base position.

According to the disclosure, the actuating device 3 is designed so that it is pretensioned in the intermediate position in the direction of the switch position and/or the base position. This means that the pretensioning acts on the actuating device 3 in the switching direction of the actuating device 3.

In particular, the actuating device 3 has an (axially) displaceable shift fork 4 and a first actuator element 5, which is used to (axially) move the shift fork 4 in a first switching direction, here in a first axial direction (to the right in FIG. 1), and thus for adjustment the actuating device 3 is used in the switch position, and a second actuator element 6, which is used to axially move the shift fork 4 in a second switching direction, here in a second axial direction (to the left in FIG. 1), and thus serves to adjust the actuating device 3 into the base position. This means that the first and second switching directions are opposite directions.

In addition, the actuating device 3 has a spring device, here in the form of a (single) spring 7, which acts in the respective switching direction between the two actuator elements 5, 6. The spring 7 is arranged in particular axially between the two actuator elements 5, 6. The spring 7 is arranged so that in the compressed state thereof it applies a spring force to the first actuator element 5, which acts in the direction of the first axial direction, and to the second actuator element 6, which acts in the direction of the second axial direction. This means that the spring force acts in the corresponding direction of displacement. The spring 7 thus rests on a spring contact surface of the respective actuator element 5, 6, which is axially opposite to a shift fork contact surface of the respective actuator element 5, 6. In the intermediate position of the actuating device 3, the spring 7 is compressed. The actuating device 3 has a shift sleeve 8 which is axially fixed to the shift fork 7 and which, depending on the axial position thereof, establishes or releases a rotationally fixed engagement between the two components of the claw coupling.

The actuating device 3 has a detent 9. The detent 9 has a detent body 10 which is axially fixed to the shift fork 4 or the shift sleeve 8. In addition, the detent 9 has a first detent groove 11 and a second detent groove 12, wherein the detent body 10 can be brought into engagement with the first detent groove 11 when the actuating device 3 is in the base position, and can be brought into engagement with the second detent groove 12 when the actuating device 3 is in the switch position. The detent 9 has a detent spring 13, which applies a pretensioning to the detent body 10 in the direction of the first detent groove 11 or the second detent groove 12, so that the pretensioning must be overcome to displace the shift fork 4. The detent 9 thus holds the shift fork 4 in the base position or switch position until the force in the direction of displacement is greater than the force counteracting the displacement by the detent spring 13.

The actuating device has a switching contour 14. The switching contour 14 is used to relocate the two actuator elements 5, 6. The two actuator elements 5, 6 each rest on opposite sides, in particular axially on the outside, on the switching contour 14.

On the side of the first actuator element 5, the switching contour 14 has a first outer surface 15, a first gap 16 adjacent to the first outer surface 15 in the adjustment direction of the switching contour 14 (downward in FIG. 1), and a first ramp 17 adjacent to the first gap 16 in the adjustment direction, which in turn is adjacent to the first outer surface 15 in the adjustment direction. The first gap 16 is axially offset from the first outer surface 15. The first ramp 17 connects the axial offset between the first gap 16 and the first outer surface 15 via an inclined surface. When the first actuator element 5 rests on the first outer surface 15, it is in a deflected position. When the first actuator element 5 abuts the first gap 16, it is in a non-deflected position. Thus, the first actuator element 5 is displaced by the adjustment of the switching contour 14 in the adjustment direction between the deflected position and the non-deflected position. By displacing the first actuator element 5 from the deflected position to the non-deflected position, the shift fork 4 is displaced axially and the actuating device 3 is moved from the base position to the switch position.

On the side of the second actuator element 6, the switching contour 14 has a second outer surface 18, a second gap 19 adjacent to the second outer surface 18 in the adjustment direction of the switching contour 14 (downward in FIG. 1) and a second gap 19 adjacent to the second ramp 20 in the adjustment direction, which in turn is adjacent to the second outer surface 18 in the adjustment direction. The second gap 19 is axially offset from the second outer surface 18. The second ramp 20 connects the axial offset between the second gap 19 and the second outer surface 18 via an inclined surface. When the second actuator element 6 rests on the second outer surface 18, it is in a deflected position. When the second actuator element 6 abuts the second gap 19, it is in a non-deflected position. Thus, the second actuator element 6 is displaced by the adjustment of the switching contour 14 in the adjustment direction between the deflected position and the non-deflected position. By displacing the second actuator element 6 from the deflected position to the non-deflected position, the shift fork 4 is displaced axially and the actuating device 3 is moved from the switch position to the base position.

The switching contour 14 can be designed as a circular ring, so that the first outer surface 15, the first gap 16, and the first ramp 17, or the second outer surface 18, the second gap 19, and the second ramp 20 repeat in the adjustment direction.

In the embodiment shown, the actuating device 3 has a guide 21 in which the switching contour 14 is guided axially on both sides.

The actuating device 3 has an actuator drive 22, through which the switching contour 14 can be moved, in particular rotated, in the adjustment direction by the engine.

In FIG. 1, a drive wheel 23 is shown, which can be decoupled with the coupling device 1, in particular from a drive train of a motor vehicle. The coupling device 1 is positioned directly on the drive wheel 23.

The functioning of the coupling device 1 is explained in particular with reference to FIGS. 2a to 2f.

Figures 2A, 2B, 2C, 2D, 2E, 2F:
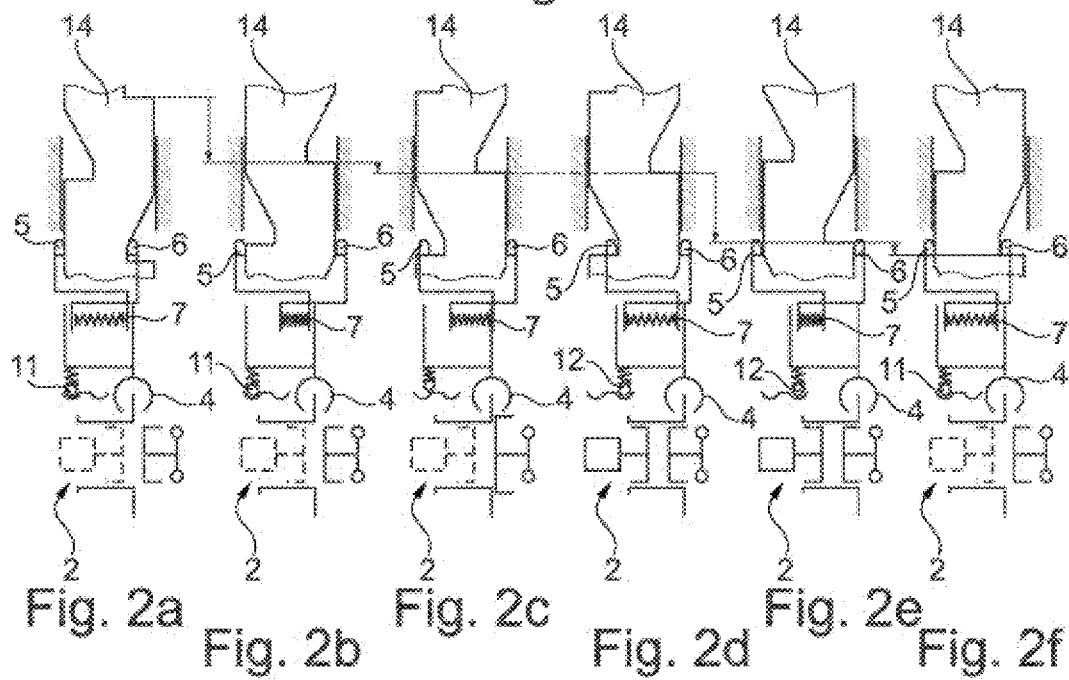
FIGS. 2a to 2f show schematic representations of the coupling device in different positions.

In FIG. 2a, the actuating device 3 is in the base position. The first actuator element 5 rests on the first outer surface 15 and is in the deflected position. The second actuator element 6 rests against the second gap 19 and is in the non-deflected position. The spring 7 is minimally pretensioned or relaxed. The detent body 10 is in the first detent groove 11. The coupling 2 is open.

In FIG. 2b, the actuating device 3 is in the intermediate position. Compared to FIG. 2a, the switching contour 14 was moved in the adjustment direction. The first actuator element 5 was displaced along the first outer surface 15 by the adjustment of the switching contour 14, (still) rests against the first outer surface 15, and is in the deflected position. The second actuator element 6 was displaced along the second ramp 20 by adjusting the switching contour 14, rests against the second outer surface 18, and is in the deflected position. Because both actuator elements 5, 6 are in their deflected position, the spring 7 is compressed between the two actuator elements 5, 6. Due to the detent 9, the shift fork 4 is not adjusted axially, but the actuating device 3 is pretensioned. The coupling 2 remains open.

In FIG. 2c, the shift sleeve 8 engages the claw toothing (tooth-on-tooth position) in such a way that it cannot be moved and the coupling 2 remains open. Compared to FIG. 2a, the switching contour 14 was moved in the adjustment direction. The first actuator element 5 was moved into the first gap 16 by adjusting the switching contour 14 along the first outer surface 15, but a contact with the first gap 16 and a displacement into the non-deflected position is prevented by the mismatched position of the claw toothing and the shift sleeve 8. The second actuator element 6 was displaced along the second outer surface 18 by the adjustment of the switching contour 14, (still) rests against the second outer surface 18, and is in the deflected position. The pretensioning of the spring 7 presses the first actuator element 5 toward the non-deflected position, so that the detent 9 is released, but the complete axial adjustment of the shift fork 4 is prevented by the mismatched position of the claw toothing and shift sleeve 8.

In FIG. 2d, the actuating device 3 is in the switch position. Compared to FIG. 2c, the tooth-on-tooth position was reversed and the actuating device 3 was moved into the switch position by the pretensioning of the spring 7 (even without powering the actuator drive 22). The first actuator element 5 was moved by the pretensioning of the spring 7, now rests against the first gap 16, and is in the non-deflected position. The second actuator element 6 (still) rests against the second outer surface 18, and is in the deflected position. The spring 7 is relaxed. The detent body 10 is in the second detent groove 12. The coupling 2 is closed.

In FIG. 2e, the actuating device 3 is in the intermediate position. Compared to FIG. 2d, the switching contour 14 was moved in the adjustment direction. The first actuator element 5 was displaced along the first ramp 17 by adjusting the switching contour 14, rests against the first outer surface 15, and is in the deflected position. The second actuator element 6 was displaced along the second outer surface 18 by the adjustment of the switching contour 14, (still) rests against the second outer surface 18, and is in the deflected position. Because both actuator elements 5, 6 are in their deflected position, the spring 7 is compressed between the two actuator elements 5, 6. Due to the detent 9, the shift fork 4 is not adjusted axially, but the actuating device 3 is pretensioned. The coupling 2 remains closed.

In FIG. 2f, the actuating device 3 is in the base position. Compared to FIG. 2a, the switching contour 14 was moved in the adjustment direction. The first actuator element 5 was displaced along the first outer surface 15 by the adjustment of the switching contour 14, (still) rests against the first outer surface 15, and is in the deflected position. The second actuator element 6 was moved into the second gap 19 by adjusting the switching contour 14 along the second outer surface 18, rests against the second gap 19, and is in the non-deflected position. The spring 7 is minimally pretensioned or relaxed. The detent body 10 is in the first detent groove 12. The coupling 2 is open.

Figure 3:
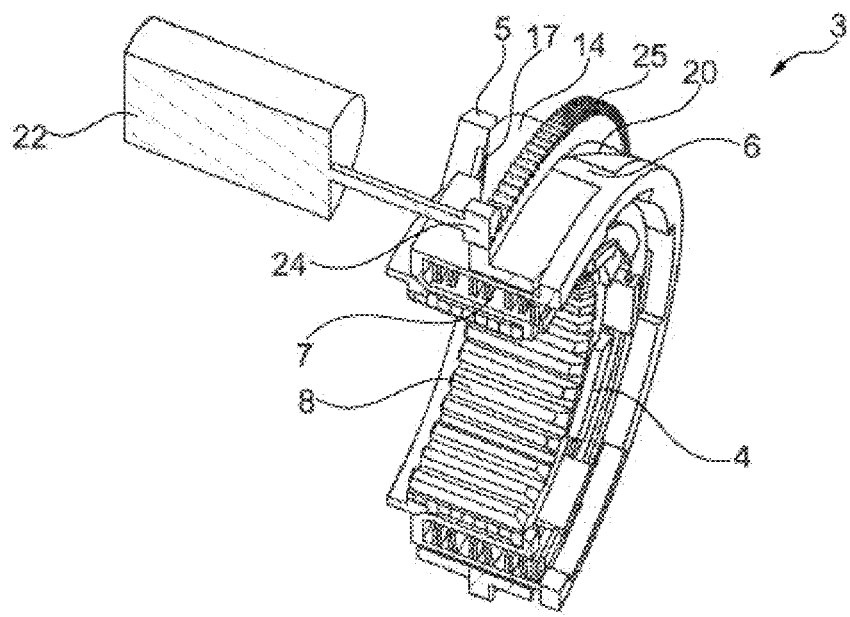
FIG. 3 shows a perspective sectional view of an actuating device of the coupling device.
Figure 4:
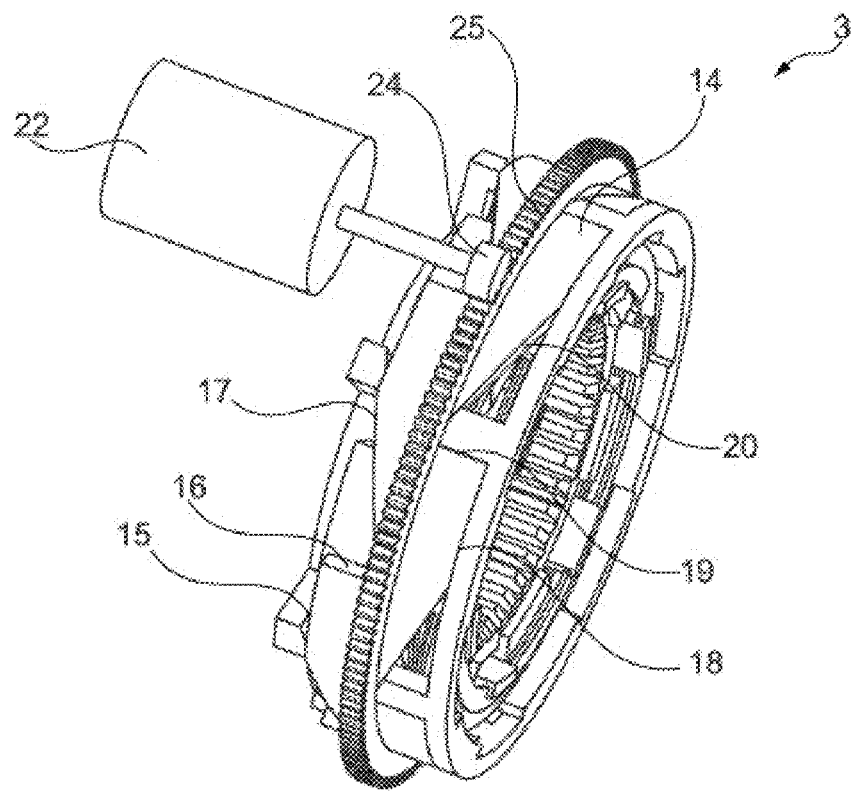
FIG. 4 shows a perspective representation of the coupling device.

FIGS. 3 and 4 show perspective representations of the actuating device 3. The switching contour 14 designed as a circular ring is moved, in particular rotated, in the adjustment direction by the actuator drive 22. For this purpose, the actuator drive 22 has a spur gear toothing 24, which is in toothing engagement with a spur gear toothing 25 formed on the switching contour 14. In particular, in FIG. 4 it can be seen that the first outer surface 15, the first gap 16, and the first ramp 17, or the second outer surface 18, the second gap 19, and the second ramp 20, are repeated when viewed in the adjustment direction (i.e., in the circumferential direction), so that the switching contour 14 can be rotated in one direction without restriction.

LIST OF REFERENCE SYMBOLS

1 Coupling device
2 Coupling
3 Actuating device
4 Shift fork
5 First actuator element
6 Second actuator element
7 Spring
8 Shift sleeve
9 Detent
10 Detent body
11 First detent groove
12 Second detent groove
13 Detent spring
14 Switching contour
15 First outer surface
16 First gap
17 First ramp
18 Second outer surface
19 Second gap
20 Second ramp
21 Guide
22 Actuator drive
23 Drive wheel
24 Spur gear toothing
25 Spur gear toothing

The invention claimed is:

1. A switchable coupling device for a drive train of a motor vehicle, comprising:
   a coupling having an non-torque-transmitting open position and a torque-transmitting closed position, and
   an actuating device configured to be selectively moved between a base position and a switch position so as to adjust the coupling from the non-torque-transmitting open position to the torque-transmitting closed position, the actuating device comprising:
      a first actuator element configured for moving the actuating device in a first switching direction,
      a second actuator element configured for moving the actuating device in a second switching direction, and the second actuator element and the first actuator element are separate components,
      a spring device, and in a pretensioned state, the spring device presses at least one of the first actuator element directly against a motor-adjustable switching contour in the first switching direction or the second actuator element directly against a motor-adjustable switching contour in the second switching direction, and
   the actuating device has an intermediate position located between the base position and the switch position, and the actuating device is configured such that the actuating device in the intermediate position is pretensioned in a direction of at least one of the switch position or the base position.

2. The switchable coupling device according to claim 1, wherein the spring device is a spring acting between the first actuator element and the second actuator element.

3. The switchable coupling device according to claim 1, wherein the actuating device comprises:

a shift fork configured to be moved axially by the first actuator element and the second actuator element, and
a detent configured to lock the shift fork in axial end positions thereof.

4. The switchable coupling device according to claim 1, wherein the motor-adjustable switching contour continuously guides the first actuator element and the second actuator element.

5. The switchable coupling device according to claim 4, wherein the motor-adjustable switching contour is configured such that the first actuator element and the second actuator element can each be moved between a deflected position and a non-deflected position, wherein the spring device is pretensioned when both the first actuator element and the second actuator element are in the deflected position.

6. The switchable coupling device according to claim 5, wherein the spring device is relaxed when one of the first actuator element or the second actuator element is in the deflected position and a remaining one of the first actuator element or the second actuator element is in the non-deflected position.

7. The switchable coupling device according to claim 6, wherein the motor-adjustable switching contour is configured as a circular ring which can be rotated to displace the actuating device.

8. The switchable coupling device according to claim 7, wherein the actuating device further comprises an actuator drive configured for rotating the circular ring so as to adjust a rotational position of the motor-adjustable switching contour.

9. The switchable coupling device according to claim 8, wherein the actuator drive and the motor-adjustable switching contour are connected to one another via gears for adjusting the rotational position of the motor-adjustable switching contour.

10. The switchable coupling device according to claim 4, arranged on a drive wheel.

11. The switchable coupling device according to claim 1, wherein the actuating device comprises a circular ring having:
a first axially extending gap on a first axial side,
a second axially extending gap on a second axial side, and
the first axially extending gap and the second axially extending gap are arranged on the circular ring so that they alternate circumferentially, and the actuating device moves axially from the base position to the intermediate position, and axially from the intermediate position to the switch position via the first axially extending gap and the second axially extending gap.

12. The switchable coupling device according to claim 11, wherein the circular ring further comprises:
a first ramp configured to connect the first axially extending gap to a first outer surface of the first axial side, and
a second ramp configured to connect the second axially extending gap to a second outer surface of the second axial side.

13. The switchable coupling device according to claim 12, wherein the actuating device further comprises:
a first actuator element configured for moving the actuating device in a first axial direction from the base position to the intermediate position,
a second actuator element configured for moving the actuating device in a second axial direction, and
a spring, and in the intermediate position the spring presses: i) the first actuator element in the first axial direction via the first axially extending gap, and ii) the second actuator element in the second axial direction via the second axially extending gap.

14. The switchable coupling device according to claim 13, wherein the spring is compressed via: i) circumferential movement of the first ramp against the first actuator element, and ii) circumferential movement of the second ramp against the second actuator element.

15. A switchable coupling device for a drive train of a motor vehicle, comprising:
a coupling having a non-torque-transmitting open position and a torque-transmitting closed position, and
an actuating device configured to be selectively moved axially so as to actuate the coupling from the non-torque-transmitting open position to the torque-transmitting closed position, the actuating device having:
a circular ring having a motor-adjustable switching contour disposed on two axial sides of the circular ring, the motor-adjustable switching contour configured to move the actuating device in a first axial direction and a second axial direction,
a base position corresponding to the non-torque-transmitting open position of the coupling, and
a switch position corresponding to the torque-transmitting closed position of the coupling, and
the actuating device is configured to repeatedly switch back and forth between the base position and the switch position via a same rotational direction of the circular ring.

16. The switchable coupling device according to claim 15, further comprising:
a first actuating element engaged with a first axial side of the circular ring via a spring, the first actuating element configured to move the actuating device in the first axial direction via the spring and the motor-adjustable switching contour, and
a second actuating element engaged with a second axial side of the circular ring via the spring, the second actuating element configured to move the actuating device in the second axial direction via the spring and the motor-adjustable switching contour.

17. The switchable coupling device according to claim 16, wherein the actuating device further comprises an intermediate position arranged between the base position and the switch position, and the spring is compressed further in the intermediate position than in the base position.

18. The switchable coupling device according to claim 17, wherein the motor-adjustable switching contour further comprises:
a first axially extending gap arranged on the first axial side of the circular ring, and the first actuating element is configured to move in the first axial direction to the switch position via the first axially extending gap, and
a second axially extending gap arranged on the second axial side arranged of the circular ring, and the second actuating element is configured to move in the second axial direction to the base position via the second axially extending gap.

19. A method of actuating a switchable coupling for a drive train of a motor vehicle, the method comprising:
in a non-torque-transmitting open position of the switchable coupling, rotating a circular ring via an electric motor in a first rotational direction from a base position to a first intermediate position so as to axially compress a spring via a first actuating element continuously following a switching contour of the circular ring,
in the non-torque-transmitting open position of the switchable coupling, rotating the circular ring via the electric motor in the first rotational direction from the first intermediate position to a switch position so as to axially decompress the spring via a second actuating element continuously following the switching contour of the circular ring, the switch position defining a torque-transmitting closed position of the coupling, in the torque-transmitting closed position of the coupling, rotating the circular ring via the electric motor in the first rotational direction from the switch position to a second intermediate position so as to axially compress the spring via the second actuating element continuously following the switching contour of the circular ring, in the torque-transmitting closed position of the coupling, rotating the circular ring via the electric motor in the first rotational direction from the second intermediate position to the base position so as to axially decompress the spring, and wherein the first actuating element is configured to move independently relative to the second actuating element via the switching contour.

20. The method of claim 19, wherein the first actuator element and the second actuator element are separate components.

* * * * *